United States Patent [19]

Ichii et al.

[11] Patent Number: 5,504,737
[45] Date of Patent: Apr. 2, 1996

[54] MONITORING MULTIPLEX TRANSMISSION SYSTEM HAVING A RESPECTIVE CONTROLLER FOR EACH OF A NUMBER OF TRANSMISSION DEVICES IN THE SYSTEM

[75] Inventors: Eiji Ichii; Mitsunori Kato; Shigeki Itabashi, all of Hiratsuka; Hiroshi Mizoguchi, Yokohama, all of Japan

[73] Assignee: The Furukawa Electric Co., Ltd., Tokyo, Japan

[21] Appl. No.: 252,843

[22] Filed: Jun. 2, 1994

[30] Foreign Application Priority Data

Jun. 8, 1993 [JP] Japan .................................. 5-137145
Oct. 1, 1993 [JP] Japan .................................. 5-247094

[51] Int. Cl.$^6$ .................................. H04J 3/14; H04J 3/26
[52] U.S. Cl. .................... 370/17; 370/85.8; 340/825.54; 340/825.06; 307/10.1
[58] Field of Search ................... 370/13, 13.1, 14, 370/15, 17, 85.1, 91, 92, 93, 94.1, 100, 105.1, 105.4, 105.5, 110.1, 85.8, 95.2; 375/106, 111; 371/24, 15.1; 340/825.06, 825.07, 825.16, 825.2, 825.21, 825.3, 825.52, 825.54

[56] References Cited

U.S. PATENT DOCUMENTS 4,939,725  7/1990  Matsuda et al. ................... 370/110.1
5,305,316  4/1994  Yoshida et al. .................... 370/85.1
5,309,436  5/1994  Hirano et al. ..................... 370/85.1
5,375,120  12/1994 Hirano et al. ..................... 370/85.1

Primary Examiner—Hassan Kizou
Attorney, Agent, or Firm—Frishauf, Holtz, Goodman, Langer & Chick

[57] ABSTRACT

A multiplex transmission system includes a number of multiplex transmission devices connected to each other via a common transmission line for transmitting frames of data. Each frame of data includes a string of bits. The number of multiplex transmission devices includes a first multiplex transmission device having a first communication controller, the first communication controller transmitting a first frame of data at predetermined intervals of time while changing a predetermined bit of data in the first frame; and a second multiplex transmission device having a second communication controller, the second communication controller transmitting a second frame of data to the first multiplex transmission device in response to one of (i) a change in input data from an external equipment, and (ii) a change in the predetermined bit of the first frame when the first frame is received by the second multiplex transmission device from the first multiplex transmission device.

10 Claims, 10 Drawing Sheets

FIG. 13A TRANSMISSION FRAME OF BASIC NODE (RECEIVED BY I/O NODE)

FIG. 13B TRANSMISSION FRAME OF BASIC NODE (NOT RECEIVED BY I/O NODE)

FIG. 13C TRANSMISSION FRAME OF I/O NODE (NORMAL CONDITION)

FIG. 13D TRANSMISSION FRAME OF I/O NODE (ABNORMAL CONDITION)

FIG. 13E TRANSMISSION FRAME OF BASIC NODE (NOT RECEIVED BY I/O NODE)

MONITORING MULTIPLEX TRANSMISSION SYSTEM HAVING A RESPECTIVE CONTROLLER FOR EACH OF A NUMBER OF TRANSMISSION DEVICES IN THE SYSTEM

BACKGROUND OF THE INVENTION

1. Field of the Invention

The present invention relates to a multiplex transmission system which is used for automobile electric systems of a multiplex transmission type to transmit data in a multiplex mode.

2. Description of the Related Art

Conventionally, in the multiplex transmission system of this type, a plurality of multiplex transmission devices (hereinafter called nodes) are connected via a transmission line consisting of a twisted pair etc., and these nodes and the transmission line constitute a multiplex communication network.

The nodes are broadly classified into two categories according to the method for fulfilling the communication control function: a node requiring software to fulfill the multiplex communication function (hereinafter called a basic node) and a node requiring no software to fulfill the multiplex communication function (hereinafter called an I/O node).

The basic node can optionally set the data transmission timing by using the control function of a microcomputer. Therefore, the basic node can spontaneously perform cyclic data transmission. The basic node used for automobile electric system includes an instrument panel node, a cowl node, a seat node, and other nodes requiring an application control function. The instrument panel node, being located, for example, near the meters, controls the function of the meter. The cowl node, being located, for example, at the cowl position, controls the timer function and the alarm function. The seat node carries out the operation control of memory for storing, for example, the seat position of power seat.

The I/O node fulfills the data input/output control function by using hardware. The I/O node requires no microcomputer when no application control function is needed, which offers an advantage of decreased node cost. On the other hand, the I/O node cannot optionally set the data transmission timing, unlike the basic node, because it has no microcomputer. Therefore, the I/O node sends out data to the transmission line, for example, when the logic level of input signal, which is inputted from the outside to an input circuit, changes from a high level to a low level or from a low level to a high level. The I/O node Used for automobile electric systems includes a door node and other nodes requiring no application control function. The door node transmits and receives signals relating to the drive of the auxiliary driving equipment (door lock motor) arranged on the door.

With the conventional multiplex transmission system, the basic node fulfills the multiplex communication function by using a communication control program in the microcomputer and a communication control circuit, so that a frame, which is a communication data block, is transmitted and received.

The multiplex transmission system of this type sometimes produces a data transmission error, though the probability is very low. To solve this problem, there is a method for enhancing reliability of data transmission, which is provided by the cyclic transmission of data, as one of fail-safe measures against the data transmission error. With this method, even if a transmission error occurs at the node on the signal receiving side with a very low probability, the data is returned to the correct condition by the frame sent next, which attains fail-safe. For example, in the cowl node, the cyclic transmission which is performed for the necessity of the fail-safe measures can be achieved by the control function of the microcomputer. For example, for the frame for the door node, the data of driving signal of the door lock motor, which is the auxiliary driving equipment of door node, is allocated to the data area in the frame transmitted cyclically.

The I/O node, having no microcomputer, fulfills the input/output control function and the multiplex communication control function by using a communication controller (hereinafter called an I/O controller). For this reason, the I/O node cannot perform cyclic transmission spontaneously, unlike the basic node. In the conventional I/O node, therefore, an oscillation circuit is connected to the input circuit so that the periodic pulse signals from the oscillation circuit are inputted to the input circuit. This periodically changes the input signal inputted to the input circuit, thus the I/O controller cyclically performing frame transmission.

In the multiplex transmission system of this type, however, a space for mounting the oscillation circuit must be provided in the I/O node because the I/O node has the oscillation circuit to perform cyclic data transmission. Therefore, the conventional multiplex transmission system has problems of large-scale system and increased cost. In addition, the I/O node cannot detect a fault if the signal transmitting/receiving circuit etc. becomes faulty, because it has no microcomputer.

SUMMARY OF THE INVENTION

The present invention was made to solve the above problems. Accordingly, an object of the present invention is to provide a multiplex transmission system which permits cyclic transmission of I/O node and achieves small size and low cost of the I/O node.

Further, another object of the present invention is to provide a multiplex transmission system which can detect a fault of the I/O node.

The above objects are achieved by the multiplex transmission system of the present invention. In the multiplex transmission system, a first communication control means (basic controller) of at least one first multiplex transmission device (basic node) of the multiplex transmission devices connected to each other via a common transmission line cyclically performs multiplex transmission by changing a predetermined bit data in a frame.

A second communication control means (I/O controller) of at least one second multiplex transmission device (I/O node) of the aforementioned multiplex transmission devices transmits a frame in accordance with the change of input data from external equipment, arid transmits a frame in accordance with the change of the predetermined bit data when the frame is received from the basic node.

With the multiplex transmission system according to the present invention, in the first multiplex transmission device, the first communication control means cyclically transmits frames. At this time, for example, the first communication control means transmits a frame by periodically inverting at least one bit data in the frame at least for each frame. In the I/O node which has periodically received this frame, the bit data inverted periodically is outputted through an output port of the I/O controller, and inputted to the I/O controller through an input port via an output circuit and an input circuit. Therefore, the input data from external equipment connected to the I/O node is cyclically sent out to the transmission line with the above period in accordance with the change of bit data inverted periodically.

The aforementioned multiplex transmission system allows cyclic: transmission of each node, and the I/O node need not have an oscillation circuit for cyclically transmitting data, which achieves small size and low cost of the I/O node.

The basic node monitors the frame returned from the I/O node, determines whether the predetermined bit data in a frame has a predetermined value, and judges that the I/O node is faulty if the predetermined bit data does not have the predetermined value.

In the I/O node, the value of the input port of the I/O controller is transmitted as the data in the frame; therefore, part of the data in the frame is inverted in accordance with the periodically inverted bit data sent from the basic node and the frame is transmitted.

With the aforementioned multiplex transmission system, in the basic node, a fault of the I/O node can be detected by monitoring the period of transmission from the I/O node and the transmission data.

The above and other objects, features, and advantages of the present invention will be more apparent from a reading of the following detailed description with reference to the accompanying drawings.

DESCRIPTION OF THE PREFERRED EMBODIMENTS (First Embodiment)

The internal configuration of a basic node and an I/O node will be described below with reference to FIG. 1. Since the basic node has a similar internal configuration for every node, the internal configuration of a cowl node will be described as a typical example. Regarding the I/O node, the internal configuration of a door node will be described as a typical example.

Figure 1:
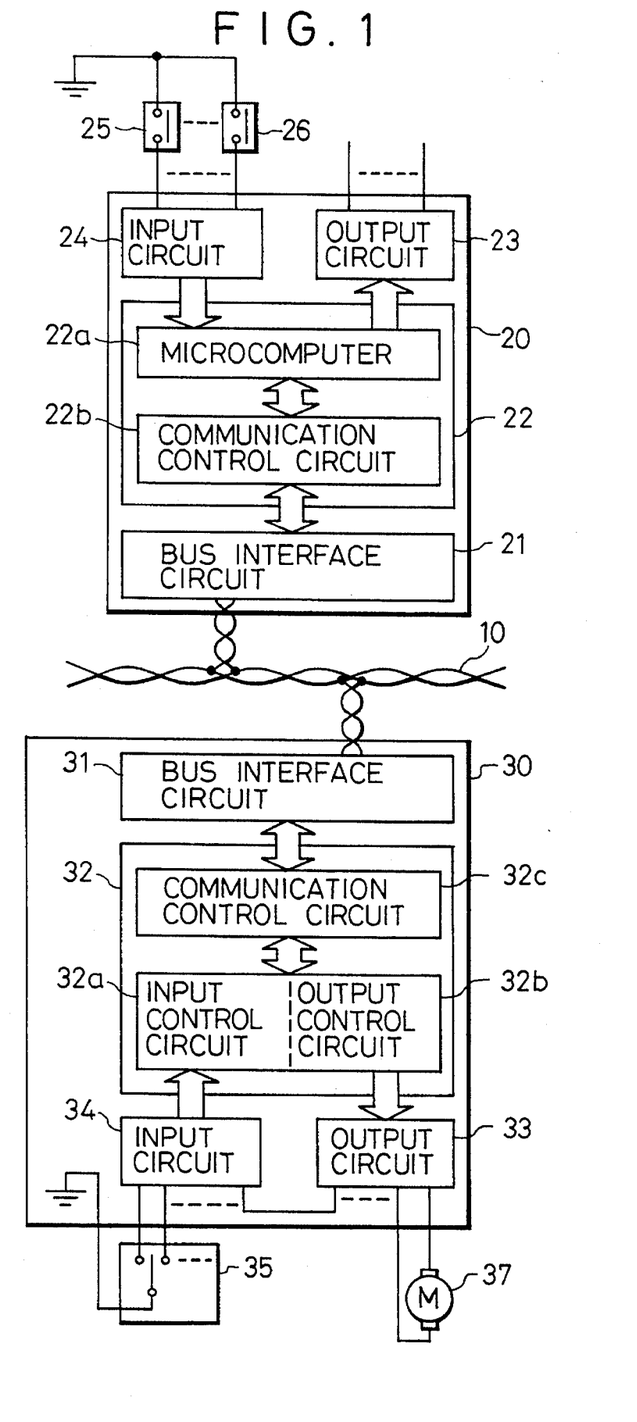
FIG. 1 is a schematic view showing one embodiment of the multiplex transmission system in accordance with the present invention.

Referring to FIG. 1, the cowl node 20 has a bus interface circuit (hereinafter called a bus I/F circuit) 21 connected to a transmission line 10, a communication controller (hereinafter called a basic controller) 22 having a multiplex communication control function, an output circuit 23 connected to the basic controller 22 and a load etc., not shown, and an input circuit 24 connected to the basic controller 22 and a switch (a keyless switch 25, a washer switch 26, etc.).

The basic controller 22 has a microcomputer 22a for executing the communication control program and other application control programs and a communication control circuit 22b for performing communication control of data frame between the cowl node and another node. In the basic controller 22, therefore, the multiplex communication function is fulfilled by the communication control program in the microcomputer 22a and the communication control circuit 22b, so that a frame, which is a communication data block, is transmitted and received.

Figure 2:
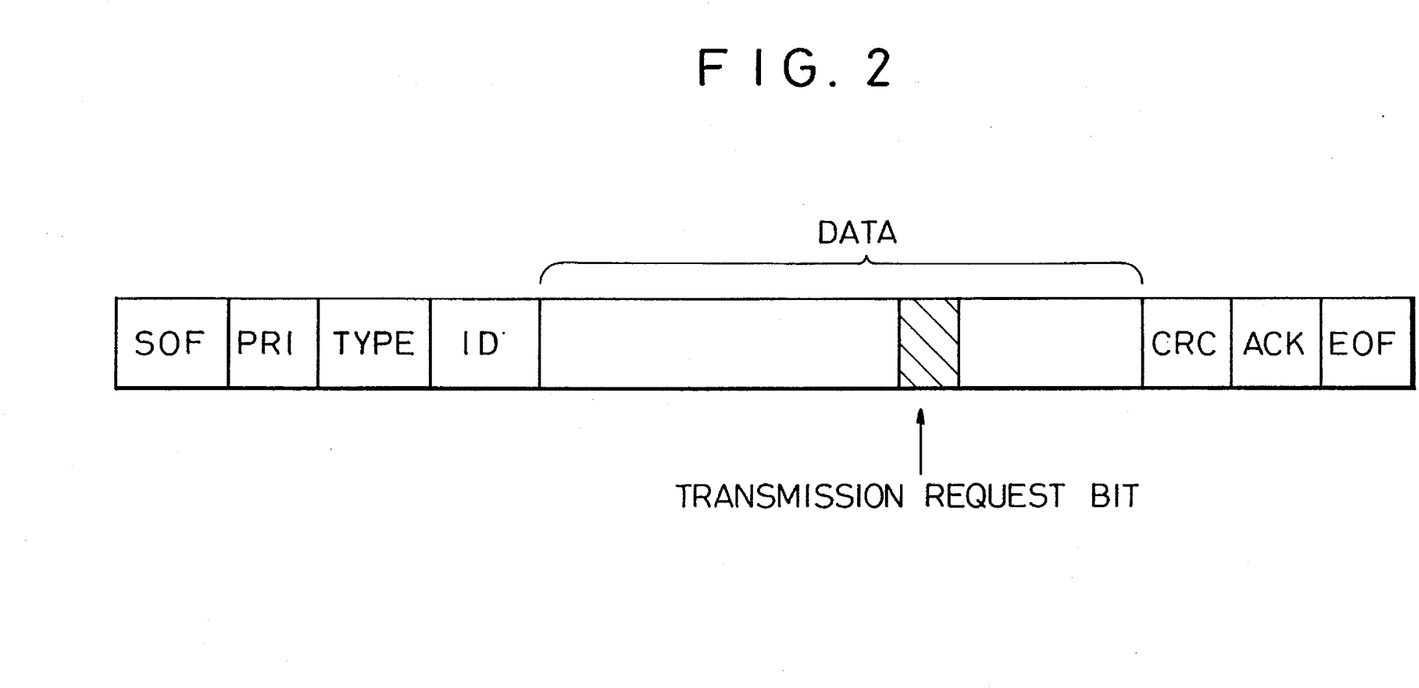
FIG. 2 is a view showing one example of data format of frame used for the multiplex transmission system in accordance with the present invention.

The format of the frame is defined by a predetermined communication protocol. As shown in FIG. 2, the frame is made up of SOF (Start Of Frame) indicating the start of the frame, PRI (Priority) indicating the priority of the frame, TYPE indicating the type of the frame, an identifier ID for identifying the content of data area in the frame, DATA indicating the data area in which data are stored, an error check code CRC for Cyclic Redundancy Check etc., an ACK area which is a return area of ACK signals, which are acknowledgment signals, and EOF (End Of Frame) indicating the end of the frame.

In this cowl node 20, as a fail-safe measure against data transmission errors, for example, a frame, in which the driving signal data of a door lock motor 37, which is auxiliary driving equipment, are allocated to the data area, is cyclically transmitted to the door node 30 via the transmission line 10. In this case, the basic controller 22 uses any one bit in the data area as a transmission request signal to the door node 30, as shown in the frame format of FIG. 2. The basic controller 22 periodically changes (inverts) this bit (hereinafter called a transmission request bit), for example, for each frame. Also, the basic controller 22 specifies the type of frame in the TYPE area of the frame to indicate that the frame has an effective data area, and specifies the destination of transmission, for example, the door node 30 of I/O node in the ID area. Thus, the basic controller 22 cyclically transmits this frame to the transmission line 10 via the bus I/F circuit 21.

For example, when the period of cyclic transmission is 50 msec and the transmission request bit is changed for each frame, the transmission request bit in the frame which is transmitted at the present time (the present time is assumed to be 0 msec) and the transmission request bits in the frames which are transmitted 100 msec and 200 msec after the present time become bit "1". The transmission request bits in the frames which are transmitted 50 msec, 150 msec, and 250 msec after the present time become bit "0". In this case, cyclic transmission is performed with a 50 msec period by the door node, which requests the cyclic transmission, as described later.

When a longer period of transmission from the cyclic transmission request node than the period of this embodiment is permitted, the transmission request bit in the frame to be transmitted can be changed with, for example, a 2 frame period, a 3 frame period, or a longer period.

The method for transmitting these frames is controlled by the software of the microcomputer in the basic node (cowl node 20 in this embodiment).

The door node 30 has a bus I/F circuit 31 connected to the transmission line 10, a communication controller (hereinafter called I/O controller) 32 having a communication control function, an output circuit 33 connected to the I/O controller 32 and load etc., not shown, and an input circuit 34 connected to the I/O controller 32 and a switch (a power seat switch 35, which is installed in the door, etc.).

The I/O controller 32 has an input control circuit 32a and an output control circuit 32b which perform input/output control with no need for software and a communication control circuit 32c which performs communication control of frame between the door node and another node with no need for software. Therefore, the I/O controller 32 of this embodiment does not require the combination of a microcomputer and a communication control circuit, unlike the basic controller, and can fulfill an input/output control function and a multiplex communication control function without a microcomputer.

When the input port logic of the I/O controller 32 is changed by the switch signal inputted from the power seat switch 35 etc. via the input circuit 34, the I/O controller allocates the switch signal data etc. to the data area in the frame and sends out the frame to the transmission line 10.

Since the door node 30 has no microcomputer, the door node 30 having the configuration described above cannot perform cyclic transmission spontaneously, unlike the basic node. Referring to FIG. 1, in this embodiment, a predetermined output terminal of the output circuit 33 and a predetermined input terminal of the input circuit 34 are connected in a pair. Specifically, in this embodiment, since the transmission request bit in the received frame has one bit, one output terminal of the output circuit 33, to which the bit is outputted, is connected to one input terminal of the input circuit 34 in a pair.

In the door node 30, therefore, the input data to the input circuit 34 can be changed periodically by inputting the received bit data from the output circuit 33 to the input circuit 34. For this reason, the I/O controller 32 can cyclically transmit the frame containing this input data.

Next, the operation of cyclic transmission between the nodes 20 and 30 shown in FIG. 1 will be described.

First, the cowl node 20, which is a basic node, cyclically transmits a frame, which contains the data to be transmitted and whose data area is effective for the door node 30, to the door node 30, which is an I/O node, through the transmission line 10.

In the door node 30, which is designated as the destination of transmission from the cowl node 20, the communication control circuit 32c of the I/O controller 32 receives this frame via the bus I/F circuit 21. Next, the communication control circuit 32c outputs the data in the data area containing the data corresponding to the logic of the transmission request bit, as necessary, to the output circuit 33 via the output control circuit 32b.

The output circuit 33 outputs the data corresponding to the transmission request bit, of the inputted data, to the input circuit 34 via the output terminal, and outputs other data to a not illustrated load etc.

The input circuit 34 outputs the data corresponding to the transmission request bit and the switch signal inputted from the connected power seat switch 35 etc. to the input control circuit 32a.

Thus, the data corresponding to the transmission request bit is fed back to the I/O controller 32 through the output circuit 33 and the input circuit 34 as necessary. The transmission request bit changes, for example, for each frame. When the transmission request bit changes, the I/O controller 32 judges that the input data has changed. Therefore, the communication control circuit 32c cyclically transmits the prepared frame to the transmission line 10 with the same period as that of the change of transmission request bit. The transmitted frame contains the data output from the power seat switch 35 etc.

In this embodiment, therefore, part of data from the basic node is changed, and cyclically transmitted to the I/O node. In the I/O node, the partial data is fed back to the I/O controller as an output data. This allows the I/O node to cyclically transmit the input data without using an oscillation circuit, which was provided previously, leading to small size and low cost of the I/O node.

In this embodiment, the I/O controller of the I/O node can cyclically transmit the input data, though it has only general multiplex communication function and input/output control function. Therefore, the I/O controller itself is simple in construction, so that small size and low cost thereof can be achieved.

Further, in this embodiment, the cyclic transmission of the I/O node can be performed by using the frame containing the data to be transmitted from the basic node to the I/O node, that is, the frame which is effective for the I/O node. Therefore, the traffic on the transmission line need not be increased only for the purpose of the cyclic transmission request from the basic node to the I/O node, so that the increase in signal transmission delay time can be prevented.

Figure 3:
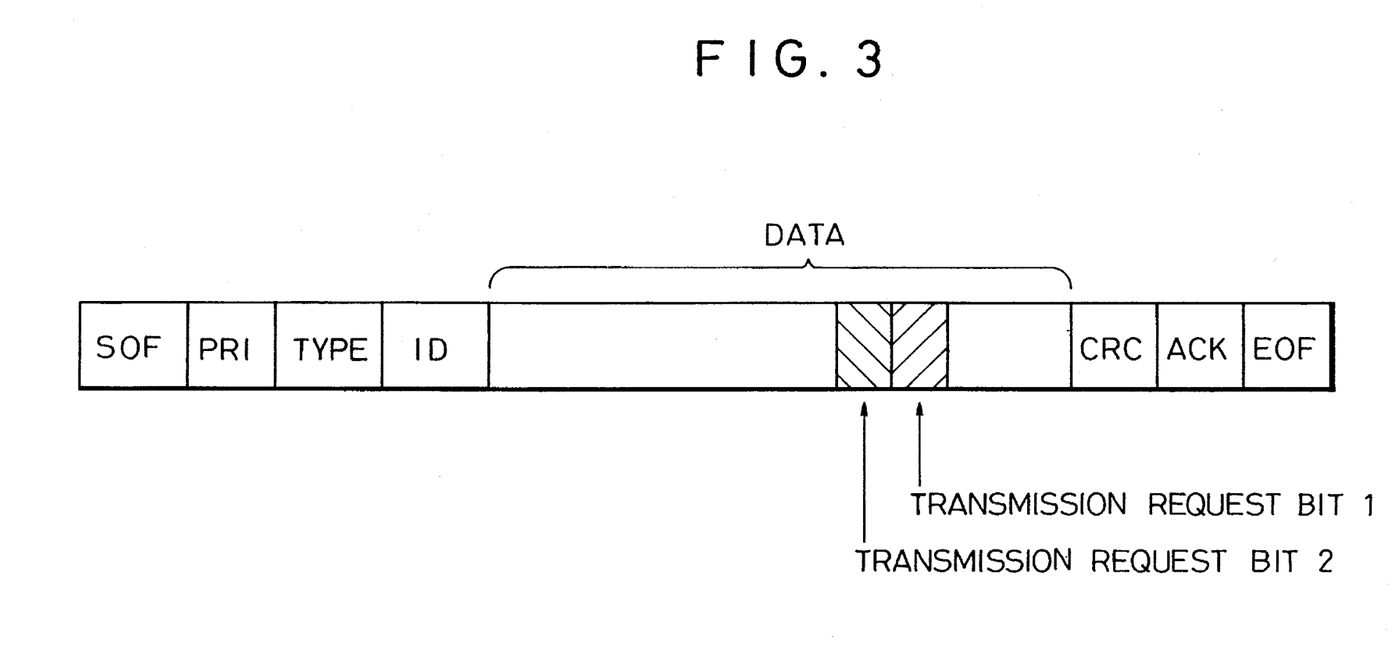
FIG. 3 is a view showing another example of data format of frame used for the multiplex transmission system in accordance with the present invention.

As shown in the frame of FIG. 3, the transmission request bit is sometimes composed of a plurality of bits (in this embodiment, the transmission request bits 1 and 2). In this case, the redundancy of system can be enhanced; the output terminal of the output circuit 33 and the input terminal of the input circuit 34 can be connected in plural pairs corresponding to the number of bits.

Figure 4:
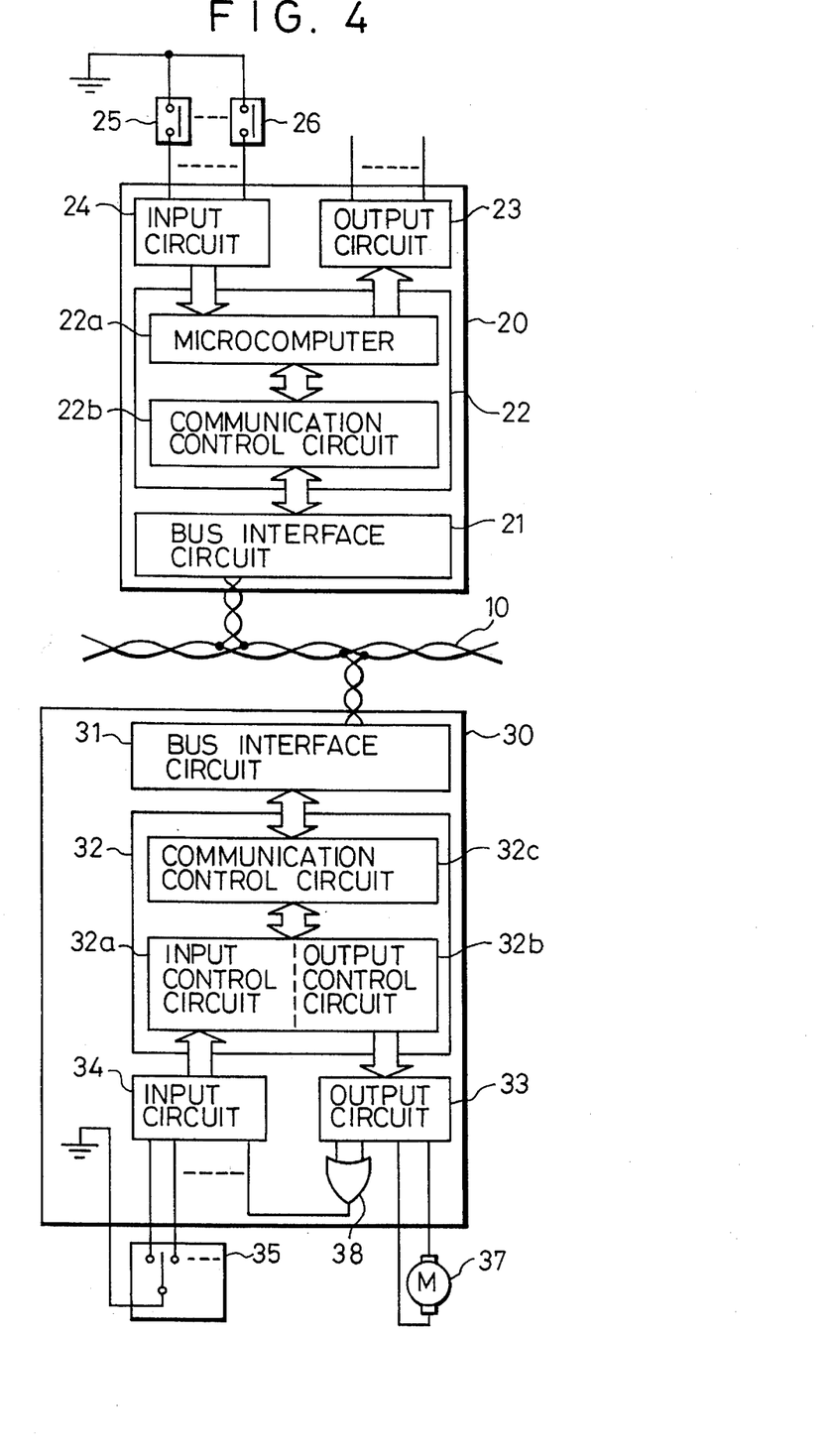
FIG. 4 is a schematic view showing another embodiment of the multiplex transmission system in accordance with the present invention.

Referring to FIG. 4, the output terminal of the output circuit corresponding to the plural transmission request bits 1 and 2 is connected to the input terminal of a circuit which produces output when the change of either input bit data is detected, for example, an OR circuit 38. Further, the output terminal of the OR circuit 38 is connected to one input terminal of the input circuit 34. With this configuration, the change of plural bit data outputted from the output circuit 33 is detected by the OR circuit 38, and the output signal corresponding to this change is inputted to one input terminal of the input circuit 34. Therefore, the input port of the I/O node for fetching input signals from the input circuit 34 can be saved, so that this input port can be used effectively.

In the case of the door node 30, in the I/O controller 32, the state (logic) of the output terminal of the output control circuit 32b connected to the output circuit 33 changes in response to the logic of a bit (transmission request bit) in the data area of the received frame. Further, in the I/O controller 32, the state (logic) of the input terminal of the input control circuit 32a connected to the input circuit 34 changes in response to the logic of the transmission request bit.

The output circuit 33 outputs the change corresponding to the transmission request bit to the input circuit 34 via the output terminal, whereas the input circuit 34 outputs the change corresponding to the transmission request bit to the input terminal of the input control circuit 32a.

Although the output terminal of the output circuit has been connected to the input terminal of the input circuit corresponding to the transmission request bit in this embodiment, this invention is not limited to this configuration; the output terminal of the output control circuit 32b corresponding to the transmission request bit can be connected to the input terminal of the input control circuit 32a. By directly inputting the change of logic corresponding to the transmission request bit from the output control circuit 32b to the control circuit 32a, the cyclic transmission of the input data can be performed.

(Second Embodiment)

In addition to the above-described first embodiment, according to the present invention, a fault of the I/O node can be monitored as necessary, by counting the time intervals at which the frames sent from the I/O node, which requests cyclic transmission, are received on the basic node side which transmits transmission request bit.

Figure 5:
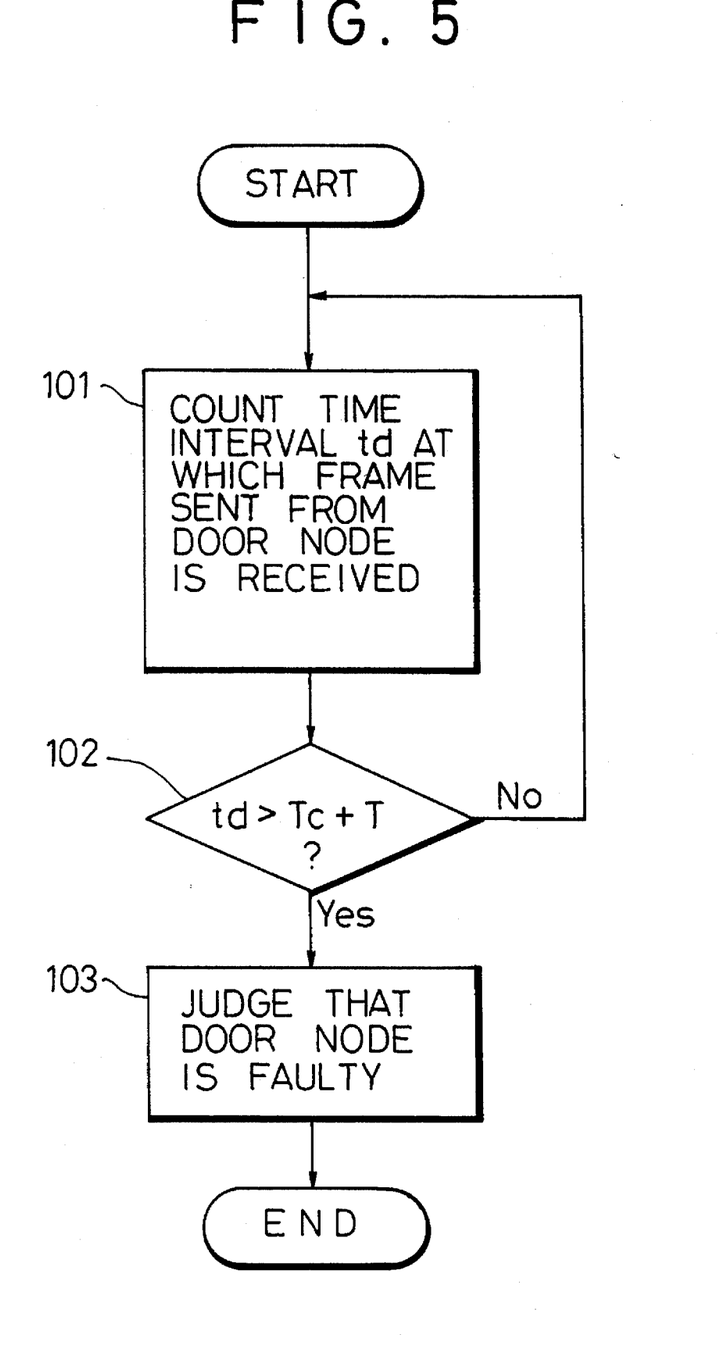
FIG. 5 is a flowchart illustrating the fault monitoring operation of a door node in accordance with the cowl node shown in FIG. 1.

For example, the cowl node 20 can monitor a fault of the door node 30 by executing the processes of the flowchart shown in FIG. 5 in the software of the microcomputer 22a in the basic controller of the cowl node 20 shown in the schematic view of the system of FIG. 1.

Referring to FIG. 5, the cowl node 20 counts the time interval td at which frames sent from the door node 30 are received (Step 101). This interval td is the time interval at which the door node 30 cyclically transmits frames.

Next, the cowl node 20 determines whether the interval td is longer than the time (Tc+T), the time TC for cyclically changing the transmission request bit sent from the cowl node 20 to the door node 30 plus a predetermined time T (Step 102). The predetermined time T is determined in advance by considering the delay time occurring, for example, when the traffic in the transmission line increases.

If the frame receiving time interval td is shorter than the time (Tc+T), the cowl node 20 goes back to Step 101, and counts the next frame receiving time interval td. If the time interval td is longer than the time (Tc+T), the cowl node 20 judges that the door node 30 is faulty (Step 103).

In this embodiment, the time interval at which frames sent from the door node 30 are received has been counted. However, the present invention is not limited to this procedure. The cowl node 20 may count, for example, the time interval at which the bit logic of data is inverted in response to the transmission request bit which is sent from the cowl node 20 and fed back through the door node 30. The faults which are thought to be capable of being monitored include a fault in which the output circuit cannot output the data due to the fault of the reception circuit, and a fault in which transmission cannot be performed, even if the state of the input terminal changes, due to the fault of the transmission circuit.

When the I/O node receives several different frames, the case where only a frame of a specific type cannot be received due to the fault of the reception circuit may be thought. In this case, the type of frame which cannot be received can be detected by performing the procedure described in this embodiment (see FIG. 5) for all types of frames received by the I/O node.

Needless to say, this fault monitoring means may be achieved by hardware.

In this embodiment, if a fault is detected in the door node 30, warning for telling the fault can be given, or shifting to substitute action in which unobjectionable behavior is exhibited can be performed.

(Third Embodiment)

In the present invention, fault monitoring of the I/O node at a node other than a source node transmitting the transmission request bit can be thought. Therefore, the node other than the source node is provided with a function for counting the change time intervals, or a function for storing the predetermined change time interval as a checking means for checking the change time of the transmission request bit data. By such functions, the node other than the source node can monitor a fault of the I/O node by counting the time interval of cyclic transmission of the I/O node, like the source node.

Figure 6:
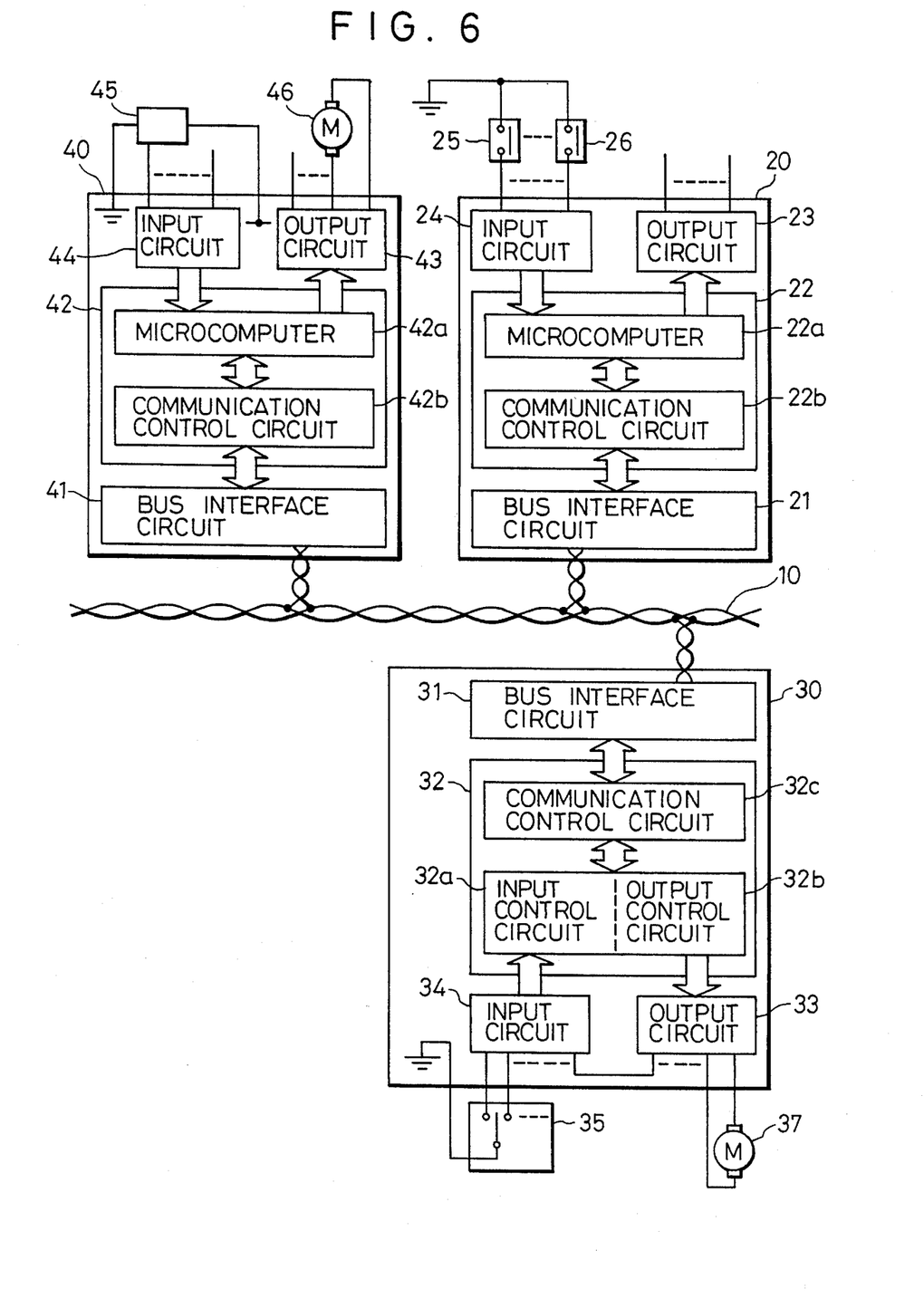
FIG. 6 is a schematic view showing still another embodiment of the multiplex transmission system in accordance with the present invention.

Referring to FIG. 6, in the system configuration of this embodiment, for example, a seat node 40 is added to the system configuration of FIG. 1 as a basic node.

To this seat node 40, a motor 46 for moving seat position, which is an auxiliary driving equipment of the seat node, a sensor 45 for detecting seat position, etc. are connected.

Figure 7:
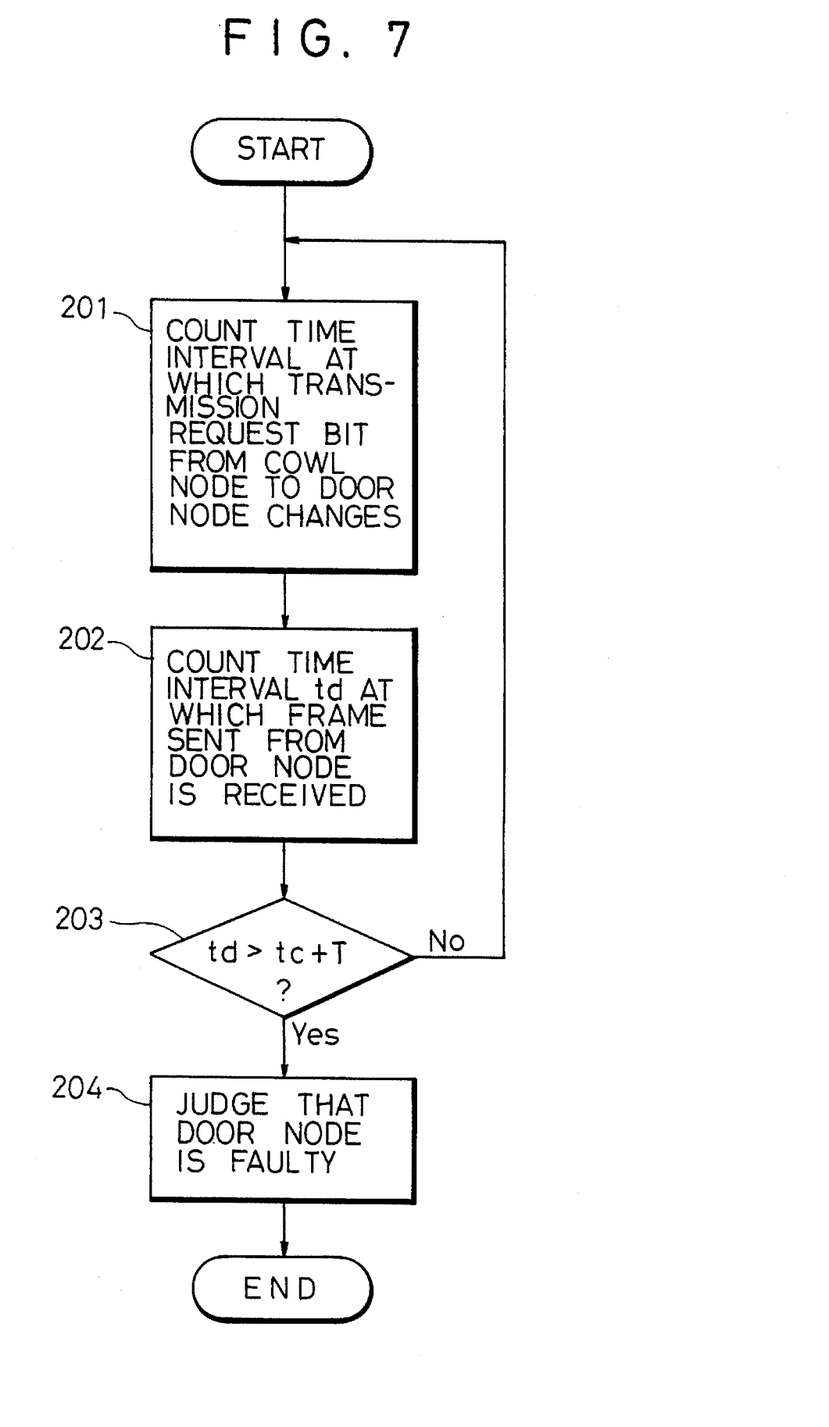
FIG. 7 is a flowchart illustrating the fault monitoring operation of a door node in accordance with the seat node shown in FIG. 6.

In this embodiment, the seat node 40 can monitor a fault of the door node 30 by executing the processes of the flowchart shown in FIG. 7 in the software of the microcomputer 42a in the basic controller 42 of the seat node 40.

Referring to FIG. 7, the microcomputer 42a of the seat node 40 counts the time interval tc at which the transmission request bit sent from the cowl node 20 to the door node 30 changes (Step 201). Further, the microcomputer 42a counts the time interval td at which frames sent from the door node 30 are received (Step 202). Next, the microcomputer 42a determines whether the frame receiving time interval td is longer than the time (tc+T), the time interval tc plus a predetermined time T (see embodiment 2)(Step 203).

If the frame receiving time interval td is shorter than the time (tc+T), the microcomputer 42a goes back to Steps 201 and 202 to count the time interval tc at which the next transmission request bit changes and the frame receiving time interval td. If the interval td is longer than the time (tc+T), the microcomputer 42a judges that the door node 30 is faulty (Step 204).

In this embodiment, the checking means (microcomputer 42a) for checking the change time of transmission request bit data has counted the time interval tc at which the transmission request bit changes. However, the present invention is not limited to this procedure. For example, the microcomputer 42a stores the predetermined change time interval of the transmission request bit data. This stored change time interval may be used to make comparison with the frame receiving time interval.

Instead of counting the time interval at which frames sent from the door node are received, the time interval at which the bit logic of the data is inverted may be counted, which data corresponds to the transmission request bit which is transmitted from the cowl node and fed back through the door node.

Needless to say, the fault monitoring means may be achieved by hardware.

(Fourth Embodiment)

The I/O node in accordance with the present invention transmits frames in response to the change of input data. In another embodiment, the value of specific bit data in the transmission frame can be specified in advance. By this, the basic node monitors the specific bit data. When the I/O node transmits a frame with the bit data of different value, the basic node can judge that the I/O node is faulty.

In this embodiment, the format of transmission frame of the I/O node is assumed to be as shown, for example, in FIG.

Figure 8:
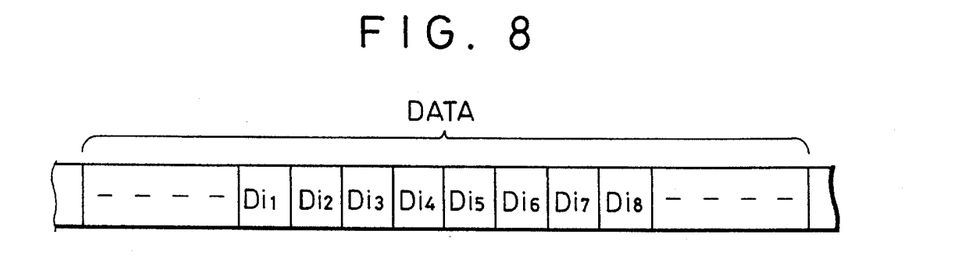
FIG. 8 is a view showing another example of DATA of the frame shown in FIG. 3.
Figure 9:
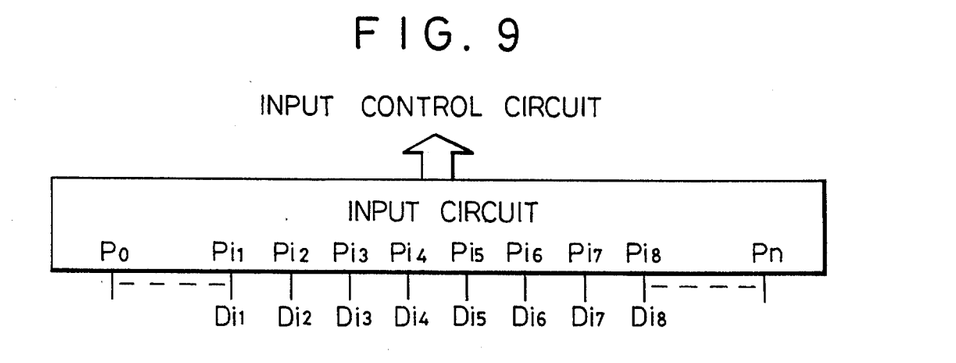
FIG. 9 is a view showing one example of the input circuit of the I/O node in accordance with the present invention.
Figure 10:
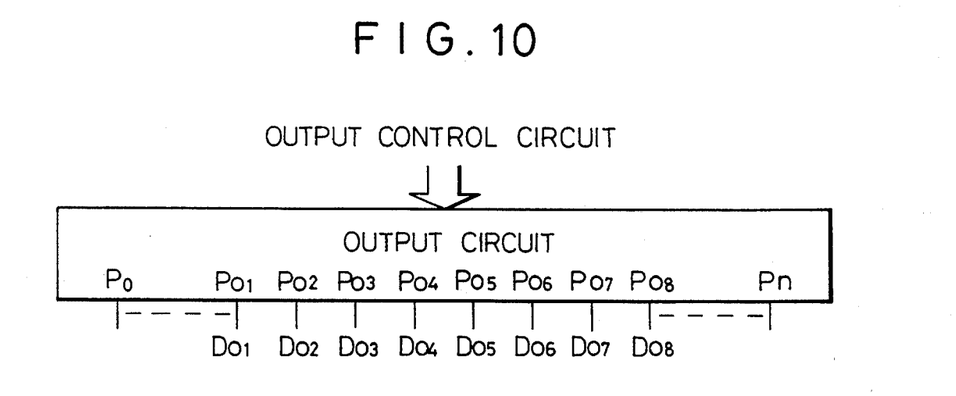
FIG. 10 is a view showing one example of the output circuit of the I/O node in accordance with the present invention.
Figure 11:
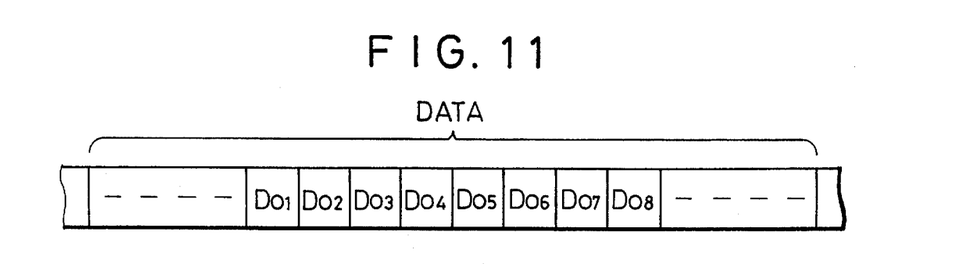
FIG. 11 is a view showing still another example of DATA of the frame shown in FIG. 3.

3. In the transmission frame, for example, bits Di1 to Di8, which are partial data of the data area, are thought as the transmission request bit as shown in FIG. 8. These bits Di1 to Di8 correspond to the input data Di1 to Di8 from the predetermined input terminals Pi1 to Pi8 of the input terminals P0 to Pn of the input circuit shown in FIG. 9. As shown, for example, in FIG. 10, the predetermined output terminals Po1 to Po8 of the output terminal P0 to Pn of the output circuit, which correspond to bits Do1 to Do8 which are partial data of the data area in the reception frame of the I/O node as shown, for example, in FIG. 11, and output the data Do1 to Do8, are thought.

When the basic node transmits frames in which the transmission request bit Di1 is changed in sequence, for example, from "0" to "1" and so on, the output terminal Po1 of the output circuit corresponding to the transmission request bit in the I/O node changes in sequence in the same manner from "0" to "1" and so on each time the frame is received. The I/O node transmits frames while changing part of data in the transmission frame from "0" to "1" and so on by inputting the output data to the input terminal Pi1 of the input circuit.

In the basic node, the logic value of the transmission request bit of the prepared transmission frame is stored in the memory of the microcomputer. The basic node monitors the bit corresponding to the transmission request bit of the data area in the frame which is returned by the I/O node, and compares the logic value of the transmission request bit of the transmission frame sent from the I/O node with the logic value of the transmission request bit stored as described above. Then, the basic node determines whether the comparison result is in the predetermined relationship, for example, whether the logic values are equal. If the logic values are not equal, the basic node judges that the I/O node is abnormal or faulty.

The aforementioned transmission request bit may be single or plural. The basic node may store not only the transmission request bit but also other plural bits, and may compare the transmission frame of the I/O node with the plural bits.

Since the I/O node which has a function for performing retransmission the predetermined times (a function for transmitting the same frames the predetermined times) can be thought, a fault of the I/O node is sometimes detected by considering the retransmitted frame.

In such a case, the fault detection need not be performed by the basic node which transmits frames containing a transmission request bit. For example, the type of frame containing the transmission bit is distinguished by TYPE or ID so as to be identified by another third node. The third node identifies the type of received transmission frame of the basic node, and stores the transmission request bit in the frame. Then, the third node compares the transmission request bit with the logic value of the transmission request bit in the data area in the received transmission frame of the I/O node, and determines whether the comparison result is in the predetermined relationship. This allows the third node to detect abnormality or fault of the I/O node.

Figure 12A:
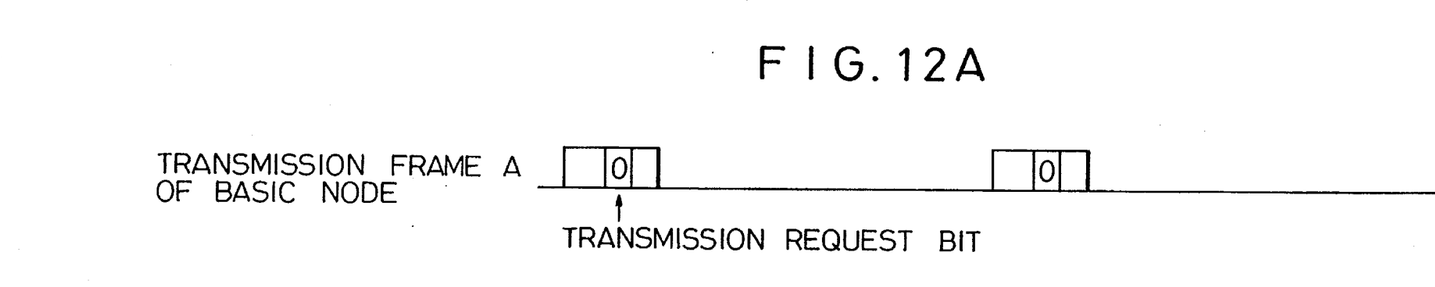
FIGS. 12A through 12C are views for illustrating one example of the signal transmitting operation of the frame in accordance with the present invention.
Figure 12B:
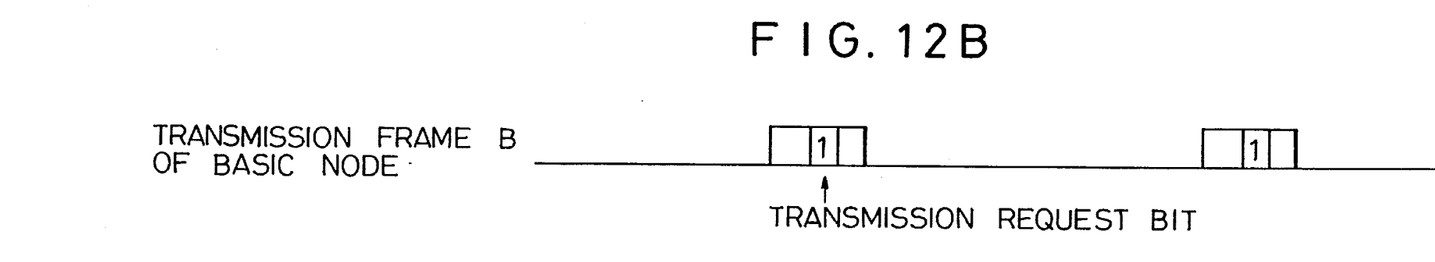
Figure 12C:
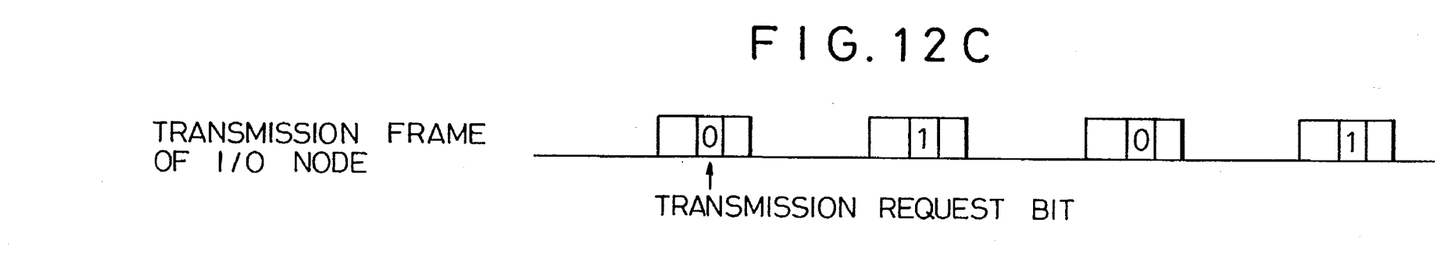

As described in the second embodiment, when the I/O node receives several types of frames, the transmission request bit may be provided for each frame. For example, when the I/O node receives two types of frames A and B, the transmission request bit can be set as shown in FIGS. 12A to 12C. In this case, the logic of the transmission request bit for frame A is set to "0" as shown in FIG. 12A, whereas the logic of the transmission request bit for frame B is set to "1" as shown in FIG. 12B. These frames are set so as to be transmitted alternately. Thus, frames in which the logic value of the transmission request bit in the data area is "0" and "1" corresponding to frame A and B are alternately transmitted from the I/O node as shown in FIG. 12C. Thus, in this embodiment, only one transmission bit is required in each transmission frame.

(Fifth Embodiment)

The I/O controller which is provided with what we call a filtering function can be thought. The filtering function is a function for receiving only frames which are necessary for that node itself and to be received and outputting the data to the output circuit. Some filtering functions are performed by distinguishing the frame on the basis of TYPE, ID, etc. for the frame having the format, for example, shown in FIG. 3. However, if the filtering function becomes defective, the I/O node receives all frames, so that erroneous data may be outputted.

In this embodiment, therefore, in order to avoid the above problem, when the I/O node transmits a type of frame which is not received by the filtering function, the basic node fixes the transmission request bit in the frame at a predetermined value, for example, "0". When a frame required by the I/O node is transmitted, the basic node alternately transmits "0" and "1" of the transmission request bit in the frame, for example, as described in the fourth embodiment.

Next, the operation for transmitting frames in this embodiment will be described with reference to FIGS. 13A through 13E. The basic node shown in FIG. 13A cyclically transmits a frame, which is required by the I/O node, with the transmission request bit alternately set at "0" and "1". The basic node shown in FIG. 13B fixes the transmission request bit in the frame, which is not required by the I/O node, at "0" and cyclically transmits it. The I/O node reads the value of the input port during transmission to make up the data of the transmission frame. Therefore, of the received frames, the frames containing the transmission request bit corresponding to the transmission request bit of the latest reception frame are transmitted.

Figure 13A:
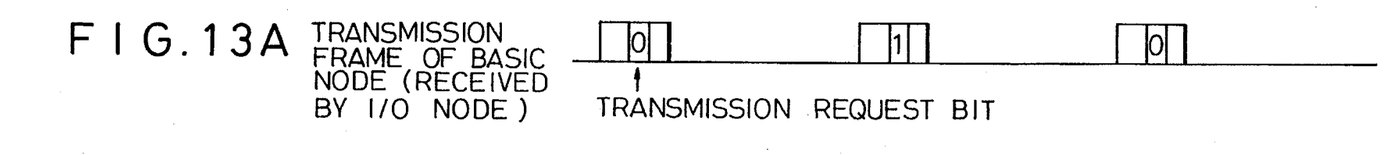
FIGS. 13A through 13E are views for illustrating another example of the signal transmitting operation of the frame in accordance with the present invention.

In normal operation, the I/O node checks TYPE, ID, etc. of the frame by using the filtering function, and receives only the frames which are necessary for the I/O node and to be received, that is, only the transmission frames shown in FIG. 13A. Then the I/O node outputs the data to the output circuit, and alternately returns the frame of "0" and "1" corresponding to the transmission request bit of the transmission frame shown in FIG. 13A (see FIG. 13C).

If the filtering function becomes defective, the I/O node receives all frames. Therefore, of the received frames, the frames containing the transmission request bit corresponding to the transmission request bit of the latest reception frame are returned. As shown in FIG. 13D, the I/O node returns the "0" frames corresponding to the transmission request bit of the transmission frame from the basic node, which is shown in FIG. 13B, so that the transmission request bit of even-numbered frame differs from that of the transmission frame in normal operation.

Therefore, a fault of the I/O node can be detected by comparing the logic value of the transmission request bit of the transmission frame shown in FIG. 13A with the logic value of the transmission request bit of the frame returned from the I/O node and checking whether the both values agree with each other.

Although in the basic node shown in FIG. 13A, the logic value of the transmission request bit has been fixed at "0", the present invention is not limited to this operation. The basic node can transmit frames containing a transmission request bit with a logic value different from the logic value of the transmission frame shown in FIG. 13A, as shown in FIG. 13E. In this case, by the time from the transmission of one frame to the transmission of next frame in FIG. 13A, the basic node shown in FIG. 13E transmits a frame containing a transmission request bit with different logic value with the same period as that of the frames of FIG. 13A, by which the basic node can check a fault of the I/O node for each period.

Figure 13B:
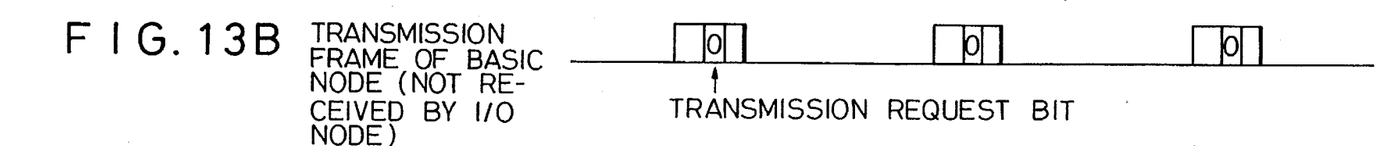
Figure 13C:
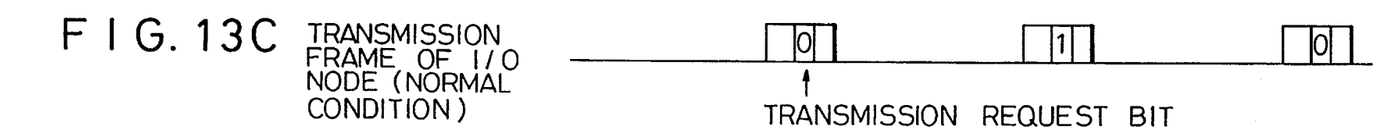
Figure 13D:
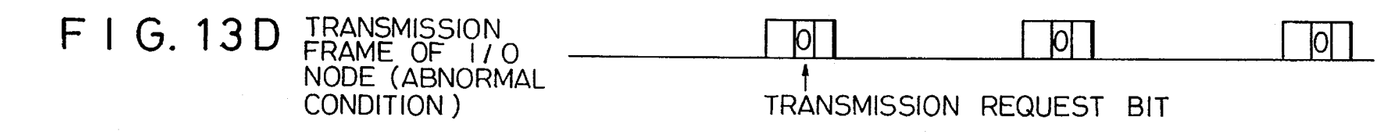
Figure 13E:
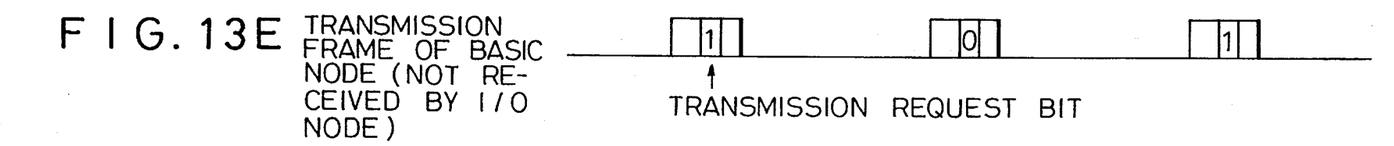

The frame transmission of FIGS. 13A and 13B or FIGS. 13A and 13E need not be performed by the same basic node, and can be performed by another third node. In this case, the third node may receive the frames of FIG. 13A and accordingly transmit the frames of FIG. 13B or FIG. 13E cyclically, or may cyclically transmit the frames of FIG. 13B or FIG. 13E with a predetermined period.

What is claimed is:

1. A multiplex transmission system including a plurality of multiplex transmission devices connected to each other via a common transmission line for transmitting frames of data, each frame of data including a string of bits, wherein said plurality of multiplex transmission devices comprise:

at least one first multiplex transmission device having a first communication control means, said first communication control means transmitting a first frame of data at predetermined intervals of time while changing a predetermined bit of data in said first frame of data;

at least one second multiplex transmission device having a second communication control means, said second communication control means transmitting a second frame of data to the at least one first multiplex transmission device in response to one of (i) a change of input data from an external equipment and (ii) a change in the predetermined bit of the first frame of data when the first frame of data is received by the at least one second multiplex transmission device from the at least one first multiplex transmission device.

2. The multiplex transmission system according to claim 1, wherein said first communication control means transmits the first frame of data to the second multiplex transmission device such that at least one bit of data in the first frame of data is inverted each time a number of first frames transmitted therefrom reaches a predetermined number.

3. The multiplex transmission system according to claim 1, wherein said second multiplex transmission device includes:

input means connected to the external equipment for fetching a plurality of input data therefrom; and output means connected to the second communication control means for outputting data in the first frame of data transmitted from the first communication control means and received by the second communication control means;

said output means outputting to said input means provided in the at least one second multiplex transmission device, a predetermined signal corresponding to a change of the predetermined bit in the first frame of data;

said input means being connected to receive from said output means the predetermined signal in the input data received from the external equipment, and said input means outputting resultant data to the second communication control means; and said second communication control means transmitting the second frame of data at predetermined intervals of time in response to changes in the resultant data input thereto from said input means.

4. A multiplex transmission system according to claim 1, wherein:

said at least one first communication control means transmits the first frame of data to the second multiplex transmission device such that a plurality of predetermined bits of data in the first frame of data are inverted each time a number of first frames transmitted therefrom reaches a predetermined number;

said at least one second multiplex transmission device includes:

input means connectable to the external equipment for fetching a plurality of input data therefrom when said input means is connected to the external equipment;

output means connected to the second communication control means for outputting data in the first frame of data transmitted from the first communication control means and received by the second communication control means; and detecting means connected to the output means;

said output means outputting to said input means a plurality of predetermined signals corresponding to changes of said plurality of predetermined bits in the first frame of data;

said detecting means outputting a detection signal to said input means upon detecting a change of any one of said plurality of predetermined signals supplied from said output means; and said input means being connected to receive the detection signal from said detecting means along with the plurality of input data from the external equipment, when said input means is connected to said external equipment, and said input means outputs a resultant data to the second communication control means; and said second communication control means transmits the second frame of data in response to a change in the resultant data input thereto from said input means.

5. The multiplex transmission system according to any one of claims 1, 2, 3 or 4, wherein:

the at least one first multiplex transmission device measures successive times at which the second frames are received from the at least one second multiplex transmission device; and further comprising:

judging means for judging that the at least one second multiplex transmission device is faulty when a measured time interval is longer than another time interval by at least a predetermined time at which the predetermined bit of data in the first frame is changed by the first communication control means.

6. The multiplex transmission system according to any one of claims 1, 2, 3 or 4, further comprising:

at least one third multiplex transmission device included in said multiplex transmission system, said at least one third multiplex transmission device having a third communication control means for carrying out mutual multiplex communication with the at least one first and the at least one second multiplex transmission devices;

first recognizing means for recognizing a first time interval between inversions of the predetermined bit in the first frame of data transmitted from the at least one first multiplex transmission device and received by the third communication control means;

second recognizing means for recognizing a second time interval between successive receptions of the second frames of data by the third communication control means transmitted from the at least one second multiplex transmission device; and fault monitoring means including judging means for judging whether the at least one second multiplex transmission device is faulty when the second time interval is longer than the first time interval by at least a predetermined time.

7. The multiplex transmission system according to any one of claims 1, 2, 3 or 4, further comprising:

fault monitoring means provided in the at least one first multiplex transmission device for monitoring at least one bit of data in the second frame of data received from the at least one second multiplex transmission device to determine whether said received at least one bit of data has at least a predetermined value; and said fault monitoring means judging that the at least one second multiplex transmission device is faulty in accordance with a monitoring result of the at least one bit.

8. The multiplex transmission system according to claim 7, further comprising:

comparing means provided in the at least one first multiplex transmission device for comparing the predetermined bit of data of the first frame of data which is changed by the first communication control means with at least one specific bit of data in the second frame of data which is transmitted from the at least one second multiplex transmission device in response to a receipt of the first frame of data; and wherein said fault monitoring means judges that the at least one second multiplex transmission device is faulty in accordance with a monitoring result of the at least one bit of data.

9. The multiplex transmission system according to claim 7, further comprising:

at least one third multiplex transmission device included in said multiplex transmission system, said at least one third multiplex transmission device having a third communication control means for carrying out mutual multiplex communication with the at least one first and the at least one second multiplex transmission devices;

comparing means for comparing the predetermined bit of data of the first frame of data which is changed by the first communication control means, with at least one specific bit of data in the second frame of data which is transmitted from the at least one second multiplex transmission device in response to a receipt of the first frame of data; and wherein said fault monitoring means judges that the at least one second multiplex transmission device is faulty in accordance with a comparison result of the comparing means.

10. The multiplex transmission system according to any one of claims 1, 3 or 4, wherein the second frame of data transmitted from the at least one second multiplex transmission device includes a specific bit of data corresponding to the predetermined bit of data in the first frame of data received from the at least one first multiplex transmission device.

* * * * *